United States Patent
Senarath et al.

(10) Patent No.: US 10,123,205 B2
(45) Date of Patent: Nov. 6, 2018

(54) ADMISSION OF A SESSION TO A VIRTUAL NETWORK SERVICE

(71) Applicants: Nimal Gamini Senarath, Ottawa (CA); Hang Zhang, Nepean (CA); Ngoc Dung Dao, Ottawa (CA); Sophie Vrzic, Kanata (CA); Philippe Leroux, Ottawa (CA)

(72) Inventors: Nimal Gamini Senarath, Ottawa (CA); Hang Zhang, Nepean (CA); Ngoc Dung Dao, Ottawa (CA); Sophie Vrzic, Kanata (CA); Philippe Leroux, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/169,469

(22) Filed: May 31, 2016

(65) Prior Publication Data

US 2016/0353281 A1 Dec. 1, 2016

Related U.S. Application Data

(60) Provisional application No. 62/169,425, filed on Jun. 1, 2015.

(51) Int. Cl.
*H04M 3/16* (2006.01)
*H04W 12/06* (2009.01)
(Continued)

(52) U.S. Cl.
CPC ......... *H04W 12/06* (2013.01); *H04L 63/0892* (2013.01); *H04W 88/18* (2013.01)

(58) Field of Classification Search
CPC ............ H04W 24/10; H04W 28/0221; H04W 28/0247; H04W 48/18; H04W 8/02
(Continued)

(56) References Cited

U.S. PATENT DOCUMENTS

| 9,038,151 B1 | 5/2015 | Chua et al. |
| 2007/0027956 A1 | 2/2007 | Castell et al. |

(Continued)

FOREIGN PATENT DOCUMENTS

| CN | 101262654 A | 9/2008 |
| CN | 101518023 A | 8/2009 |

(Continued)

OTHER PUBLICATIONS

International Search Report for International Application No. PCT/CN2016/084337 dated Sep. 1, 2016.

(Continued)

*Primary Examiner* — Charles Shedrick

(57) ABSTRACT

An aspect of the disclosure provides a method of admitting a session from a user device subscribed to a service with a virtual network operator. The method includes receiving a service request from said user device at an Access Point and selecting a network function Authentication and Authorization (AA) function (AAF) to confirm the user device is authorized for the requested service, and transmitting the request to the selected network function AAA function. The AAAF which processes the request may reside with the virtual network operator (VNO). However, the VNO may share its AAA database with other network entities (for example, Telecom Connectivity Service Providers (TCSPs) or InPs), and allow those entities to perform the AAA functions.

22 Claims, 11 Drawing Sheets

(51) Int. Cl.
*H04L 29/06* (2006.01)
*H04W 88/18* (2009.01)

(58) Field of Classification Search
USPC ............... 370/252, 328; 455/411; 713/168
See application file for complete search history.

(56) References Cited

U.S. PATENT DOCUMENTS

| | | | |
|---|---|---|---|
| 2008/0101240 | A1 | 5/2008 | Rohilla et al. |
| 2009/0113018 | A1 | 4/2009 | Thompson |
| 2011/0112894 | A1 | 5/2011 | Tan et al. |
| 2013/0013923 | A1* | 1/2013 | Thomas ............... H04W 12/06 713/168 |
| 2013/0058227 | A1 | 3/2013 | Lemieux et al. |
| 2013/0303114 | A1 | 11/2013 | Ahmad et al. |
| 2013/0312078 | A1 | 11/2013 | Oberheide et al. |
| 2013/0336210 | A1 | 12/2013 | Connor et al. |
| 2014/0086177 | A1 | 3/2014 | Adjakple et al. |
| 2014/0119218 | A1* | 5/2014 | Hsu ..................... H04L 12/1435 370/252 |
| 2014/0269295 | A1 | 9/2014 | Anumala |
| 2015/0056944 | A1 | 2/2015 | Bhatiya et al. |
| 2015/0109995 | A1* | 4/2015 | Mathai ................. H04W 48/18 370/328 |
| 2015/0312845 | A1 | 10/2015 | Teeni et al. |
| 2016/0066175 | A1 | 3/2016 | Wang et al. |
| 2016/0345151 | A1 | 11/2016 | Chen |
| 2016/0352734 | A1 | 12/2016 | Senarath et al. |
| 2017/0086118 | A1 | 3/2017 | Vrzic |
| 2017/0332359 | A1 | 11/2017 | Tsai et al. |

FOREIGN PATENT DOCUMENTS

| | | |
|---|---|---|
| CN | 103650437 A | 3/2014 |
| CN | 103765386 A | 4/2014 |
| CN | 104685935 A | 6/2015 |
| EP | 2866495 A2 | 4/2015 |
| KR | 20090066079 A | 6/2009 |
| WO | 2009058561 A1 | 5/2009 |
| WO | 2014111934 A1 | 7/2014 |
| WO | 2014183260 A1 | 11/2014 |

OTHER PUBLICATIONS

Extended European Search Report dated Feb. 28, 2018 for corresponding European Application No. 16802552.6 filed Jun. 1, 2016.
Kddi et al., Solution: Support of Switching of Network Slice; SA WG2 Meeting #S2-114 S2-161413; pp. 1-3, Apr. 11-15, 2016.
LG Electronic Inc.; Solution on Network Slice Instance Reselection; SA WG2 Meeting #116BIS S2-165256; 02, pp. 2-9, Sep. 2, 2016.
International Search Report dated Nov. 21, 2016 for corresponding International Application No. PCT/CN2016/099229 filed Sep. 18, 2016.
Xu, Chen et al., Advances on Software-defined Wireless Networking; Journal of Chongqing University of Posts and Telecommunications (Natural Science Edition); No. 4, vol. 27, Aug. 31, 2015. (Abstract only).
Hu, Xun et al., A Joint Utility Optimization Based Virtual AP and Network Slice Selection Scheme for SDWNs; Communications and Networking in China (ChinaCom), 10th International Conference, Aug. 17, 2015.
International Search Report for International Application No. PCT/CN2016/084336 dated Sep. 1, 2016.
Extended European Search Report dated Feb. 28, 2018 for corresponding European Application No. 16802551.8 filed Jun. 1, 2016.
3rd Generation Partnership Project: Technical Specification Group Services and Systems Aspects; Feasibility Study on New Services and Markets Technology Enablers; Stage 1 (Release 14), Aug. 2015, 3GPP TR 22.891 V0.2.0 (Aug. 2015).
Rachid EL Hattachi/Javan Erfanian (Editors), and 5G Initiative Team, NGMN 5G White Paper, Feb. 17, 2015, NGMN Alliance V1.0.

* cited by examiner

ADMISSION OF A SESSION TO A VIRTUAL NETWORK SERVICE

CROSS-RELATED APPLICATIONS

This Application claims priority to U.S. Provisional Patent Application Ser. No. 62/169,425 filed Jun. 1, 2015 entitled "Admission of an Individual Session/User Who Has Already Subscribed to a Virtual Network Service", the entirety of which is hereby incorporated by reference.

TECHNICAL FIELD

This disclosure relates to Virtual Networks (VNs), and more particularly to the process of admitting a user session to a VN.

BACKGROUND

In conventional mobile networks, a Radio Access Network (RAN) is paired with a, typically wireline based, core network. The RAN provides connections to the mobile devices, such as User Equipment (UE), through the use of network Access Points (AP) connected to the core network through a backhaul connection. In existing third fourth generation (3G/4G) mobile networks, the RAN and core network are closely interlinked. Typically the core and RAN are owned by a single entity that provides service to end users, and may offer a platform through which a Mobile Virtual Network Operator (MVNO) can provide services to its own end users.

In mobile networks, 4G networks, such as those compliant with the Long Term Evolution (LTE) standards set by the $3^{rd}$ Generation Partnership Project (3GPP), a UE begins an process of attaching to the network by transmitting an Attach Request. This is request is received by an eNodeB, which then sends the request to the Mobility Management Entity which resides within the core network. Authentication of the UE, the Non-Access Stratum (NAS) Security Setup and AS Security Setup are all performed. The AS Security Setup is the only process that is carried out between the UE and RAN-based entities (in this case the eNodeB). Because network operators typically own infrastructure in the RAN, as well as the Core Network, and use these resources to provide service to end users, authentication and access control procedures, are exclusively performed in the Core Network.

It is no longer necessary for a single entity to own and administer all resources and infrastructure for providing connectivity and networking services. A Mobile Virtual Network Operator (MVNO) provides services to its subscribers using the services provided and resources of the network operator (also referred to as a service provider). Typically, the MVNO provides authentication and authorization information to the network operator, so that this information can be used in the network operator's core network when an MVNO customer connects to a network access point. Some MVNOs have relationships with more than one service provider. This allows the MVNO to take advantage of the coverage maps of multiple providers. The MVNO may be able to create a broader coverage area where the service provider maps are non-overlapping, and to allow either deeper or more redundant coverage where the service areas overlap. The usage of the service provider network for traffic flows associated with the MVNO are typically governed by a Service Level Agreements (SLAs).

As network architectures evolve, the RAN may not be associated with a single Core Network. A RAN that is used for access to a series of Core Network slices (or a single Core Network that makes use of network slicing) will effectively be associated with a number of different Core Networks. When a UE attaches, an attach procedure that so heavily relies upon access to resource in the Core Network may not be feasible. There are proposals and standard preparations (such as Network Functions Virtualization (NFV) MANagement and Orchestration architectural framework (MANO), collectively NFV-MANO as described, e.g. by the European Telecommunications Standards Institute ETSI) to facilitate a network architecture where a Service Provider (SP) can provide a virtual network (VN) as a service to its customers using virtualized infra-structure resources. In such as scenario, even the SP providing the authentication and authorization information may be within the VN, and not within a core network that is directly accessible to the RAN.

There is a need for methods to admit individual sessions which belong to a VN, or to a particular Core Network (or Core Network slice as the case may be). There is a need for a framework and a method to admit individual sessions in accordance with the requirements of either the relevant Core Network or the relevant VN, SLAs and individual session requirements.

SUMMARY

An aspect of the disclosure provides a method of admitting a user session in a virtual network. The method includes receiving, at a mobility management function in a core network domain, an attach request from a User Equipment associated with the virtual network. The method further includes performing an authentication challenge with the User Equipment and an Authentication Function associated with the virtual network and outside the core network domain. The method further includes performing admitting the user equipment to a user session in the virtual network in response to successful completion of the authentication challenge.

Another aspect of the disclosure provides a method of admitting a user session in a virtual network. The method includes receiving, at a mobility management function in a core network domain, an attach request from a User Equipment associated with the virtual network; performing an authentication challenge with the User Equipment and an Authentication Function associated with the virtual network and supplied with authentication data of subscribers of the virtual network; and admitting the user equipment to a user session in the virtual network in response to successful completion of the authentication challenge.

An aspect of the disclosure provides a method for admitting a session from a user device subscribed to a service with a virtual network operator. The method includes receiving a service request from said user device at an Access Point and selecting a network Authentication and Authorization function AAF to confirm the user device is authorized for the requested service, and transmitting the request to the selected AAF. The AAF which processes the request may reside with the virtual network operator (VNO). However, the VNO may share its Authentication and Authorization (AA) database with other network entities (for example, Telecom Connectivity Service Providers (TCSPs) or InPs), and allow those entities to perform the AA functions.

If a request fails an AA process it will be rejected. There are other instances in which a user session will be blocked, and they typically relate to resource allocation. For example a user session can be blocked an admission control function if there are insufficient resources (network capacity) for the session. Generally speaking, once a new user/session successfully proceeds through an AA process, it will be admitted unless network capacity does not allow it.

An aspect of the disclosure provides a method for admission of a session in a virtual network (VN) established within a layered network. The method includes performing an admission check for a request received by an Access Point (AP) owned by a first entity of the layered network, the admission check using an AAF of a host, the host having received AA information regarding the established VN by a virtual network operator (VNO). Such a method applies when a direct association between the VNO and the first entity is unestablished. In some embodiments the host resides with the VNO. In some embodiments the AA information regarding the established VN resides with the VNO. In some embodiments the host resides in the network of a second entity of the layered network, the second entity having an association with both the VNO and the first entity. In some embodiments the host obtains the AA information regarding the established VN from the VNO. In some embodiments the host resides in the network of the first entity and is configured to obtain AA information regarding the established VN from a second entity of the layered network, the second entity having an association with both the VNO and the first entity. In some embodiments the step of performing the admission check includes forwarding the request from an AP in the first entity to a host in the network of a second entity of the layered network, the second entity having an association with both the VNO and the first entity. In some embodiments the admission check includes authentication and authorization. In some embodiments the admission check further includes an admission control check to ensure sufficient network resources are available. In some embodiments the admission check further includes an accounting check.

Another aspect of the disclosure provides method for admission of a session in a virtual network (VN) established within a layered network. Such a method includes receiving a connection request at an access point (AP) owned by a infrastructure provider (InP) of the layered network. The method further includes the AP requesting an admission check, wherein the admission check utilizes an AAF of a host, the host having received AA information regarding the VN from a virtual network operator (VNO). In such a method, the AP requesting an admission check includes the AP requesting an admission control check from a Telecom Connectivity Service Provider (TCSP) of the layered network, the TCSP having an association with both the VNO and the InP. In some embodiments the method further includes receiving an admission control response from the TCSP as to whether sufficient resources for the connection request are available within the TCSP network. In some embodiments the host resides within the InP, the AAF having been provided the AA information regarding the VN from the TCSP who in turn received the AA information regarding the established VN from the VNO. In some embodiments the host resides within the TCSP, and the AP requesting an admission check comprises transmitting a request to the host residing within the TCSP to perform authentication and authorization for the session.

Another aspect of the disclosure provides method for admission of a session in a virtual network (VN) provided by a Telecom Connectivity Service Provider (TCSP) for a Virtual Network Operator (VNO). Such a method includes receiving an admission request for the session at the TCSP from an infrastructure provider (InP) who owns an access point which received a connection request from a user equipment (UE), wherein the InP is unassociated with the VNO. Such a method further includes providing a response to the InP. In such a method, the admission request requests an admission check, including an admission control check. Such an admission check utilizes an AAF of a host, the host having received AA information regarding the established VN from a virtual network operator (VNO). In some embodiments the method also includes the TCSP performing the admission control check to determine whether sufficient resources for the requested session are available within the TCSP network. In some embodiments the host resides within the TCSP, the AAF having received the AA information regarding the established VN from the VNO. In some embodiments the host resides within the VNO and further comprising the TCSP requesting authentication and authorization from the VNO. In some embodiments the TCSP is unassociated with the InP and the received admission request from the InP was forwarded to the TCSP from a second TCSP, the second TCSP having an association with the InP. In some embodiments the TCSP negotiates with the second TCSP in order to establish an end-to-end path to admit the session.

Another aspect of the disclosure provides a host which includes a processor and machine readable memory storing machine executable instructions which when executed by the processor, instantiate an AAF for performing an admission check for a connection request received by an Access Point (AP) owned by an infrastructure provider (InP), the AAF using AA information regarding a virtual network (VN) established by a Telecom Connectivity Service Provider (TCSP) for a Virtual Network Operator (VNO). Such a host is used when the InP and the VNO are unassociated. In some embodiments the host resides within the VNO, and the machine executable instructions configure the host to receive the connection request from the TCSP, authorize and authenticate the request and provide a response to the TCSP. In some embodiments the host resides within the TCSP, and the machine executable instructions configure the host to receive the connection request from the AP, authorize and authenticate the request using information received from the VNO and provide a response to the AP. In some embodiments the host resides within the TCSP, and the machine executable instructions configure the host to receive the request from the AP and to forward the request to the VNO to authorize and authenticate the request. In some embodiments the host resides within the InP, and the machine executable instructions configure the host to receive the request from the AP and to authorize and authenticate the request using AA information received from the TCSP. In some embodiments the host resides within the InP, and the machine executable instructions configure the host to receive the request from the AP and to forward the request to the TCSP to authorize and authenticate the request.

The foregoing and other objects, features, aspects and advantages of the present invention will become more apparent from the following detailed description, taken in conjunction with the accompanying drawings which description is by way of example only.

BRIEF DESCRIPTION OF DRAWINGS

For a more complete understanding of this disclosure, reference is now made to the following brief description, taken in connection with the accompanying drawings and detailed description which illustrate and describe embodiments by way of non-limiting examples, wherein like reference numerals represent like parts.

DESCRIPTION OF EMBODIMENTS

Figure 1:
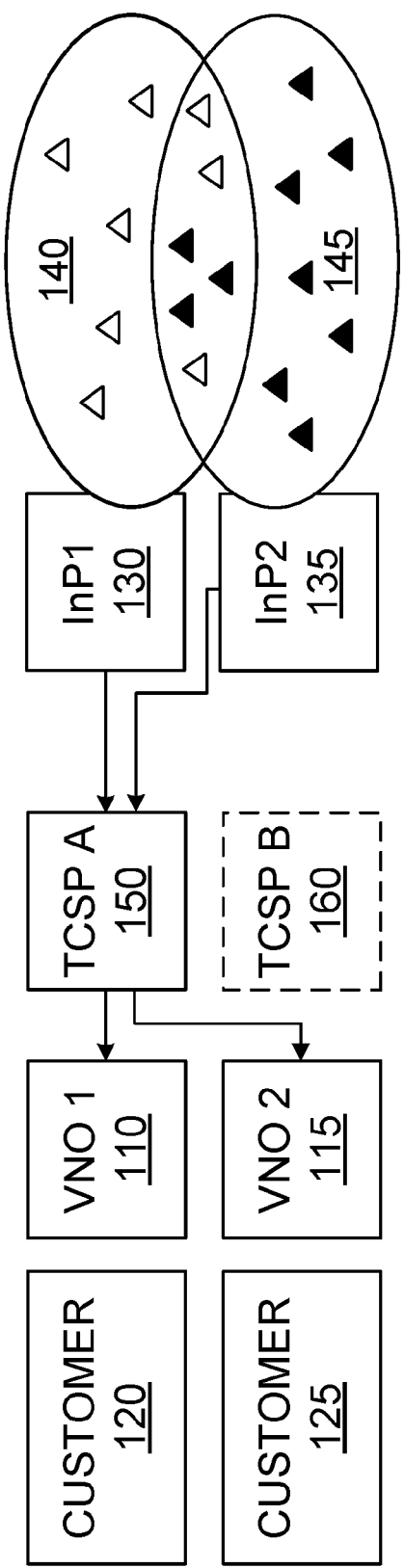
FIG. 1 is a block diagram illustrating a network architecture.

FIG. 1 is a diagram illustrating the decoupling of roles that may occur in future network architectures. Such a decoupled network architecture may be applicable to next generation wireless networks, including so-called Fifth Generation (5G) communication networks. In such a decoupled network, the network access infrastructure can be isolated as a separate entity, indicated here as an Infrastructure Provider (InP). RAN functionality provided by the InP may be separated from the Core Network into a different network domain so that it can be administered and managed separate from the Core Network. The Core Network (CN) functions may be provided by a Service Provider, referred to also as a Telecommunications Connectivity Service Provider (TCSP). In some regions, an InP may serve as the Access Network (or as a part of the Access Network) of a plurality of different TCSPs. Customer facing services are shown in the following examples as being provided by a virtual network operator (VNO). It should be understood that these divisions of the network can be purely for administrative reasons, or they could be different entities entirely. An InP may have a very small Access Network, such as a set of small access points within a building. The InP may provide access to its resources to a number of different TCSPs. This has the effect of a single RAN serving a plurality of CNs. In another example, a single InP may serve a plurality of CNs that are each really a slices of a single CN. This may occur when the same entity owns both the CN and the RAN (e.g. the TCSP and the InP are the same), but when the RAN is a separate domain so that it can serve a plurality of different CN slices.

In FIG. 1, the network architecture, according to an embodiment includes a first $InP_1$ 130 having coverage area 140, and a second $InP_2$ 135 having coverage area 145. Each InP owns connectivity resources such as APs, with the APs in black associated with $InP_2$ 135 and the APs in white associated with $InP_1$ 130. TCSP A 150 uses a portion of the resources of $InP_1$ 130 and $InP_2$ 135 to provide RAN access to the core network functions that it offers. The terms under which an InP provides access services to the TCSP may be governed by a Service Level Agreement (SLA). TCSP A 150 uses InP resources along with other network resources (including the resources it owns) to provide Core Network and Radio Access functionality to various VNOs. First and second VNOs (VNO 1 110 and VNO 2 115) acquire connectivity services from TCSP A 150 in order to provide services to their respective end user populations. Each VNO 110, 115 has its own end user population, each collectively designated respectively as Customer 1 120 and Customer 2 125. Other embodiments may comprise additional TCSPs, such as TCSP B 160. Further, those having ordinary skill in this art will appreciate that there is not a one-to-one correspondence between InPs 130, 135 and VNOs 110, 115, despite the fact that the diagram illustrates two of each. Any number of InPs, TCSPs and VNOs can be supported.

The end user populations may comprise, by way of non-limiting example, devices associated with one or more of an alarm company, a sensor company, a police department, a fire department, an e-health monitoring service and any combination of any of these. Each of these customer groups can contract with particular VNOs for virtual network (VN) services for their users/devices. Alternatively, a VNO 110, 115 may simply offer services to individual customers that subscribe to its services.

Each VNO may be considered to be a consumer of the resources and services of one or more TCSPs. The resources required by a virtual network may in some example embodiments depend upon the type and function of the virtual network.

In providing service to a VN customer, a service provider (e.g., a TCSP) may obtain infrastructure resources that may not be owned or always available to the TCSP. For example, a TCSP can obtain resources from InPs so that the VN customer can be provided services in areas in which the TCSP does not own RAN resources. The TCSP can aggregate the resources from different InPs to create a network topology that includes both node and link resources. This provides an End-to-End service for the VN, allowing a VN's customers to connect to the network and access the services.

VNOs typically provide services that are used by end users. In some examples this includes services such as a support for voice channels, mobile broadband (MBB) channels, and other data channels. Some VNOs tailor support to particular needs, such as machine-type communication (MTC) traffic, or towards certain customer groups such as emergency services (e.g. law enforcement, emergency medical services, fire departments). TCSPs provide connectivity services used by the VNOs. In some instances, the TCSP may provide connectivity and network functions that are the equivalent (or substantial equivalent) to the Evolved Packet Core (EPC) ad defined by the 3GPP. In some embodiments, the TCSP allocates services in such a manner as to make it appear as if the VNO has its own virtual network. This may be done through the use of techniques such as network slicing and network function virtualization. A single Radio Access Network may be created through the use of a number of different InPs. A TCSP can create a coverage map by obtaining RAN resources from a plurality of different InPs, and may optionally have some of its own RAN resources. In some embodiments, the TCSP allocates at least one network slice for each VNO to provide a VN to its customers with network access through the InP RAN resources.

To provide traffic isolation and some degree of control, the InP can provide resources to the TCSP as a network slice. The slice can be a hard slice (a fixed allocation of defined resources), a soft slice (an allocation of resources that can vary over time, either the quantity of resources or a variation in the particular resources that are allocated) or a hybrid of the two (e.g. a hard slice providing a guaranteed level of service, with a flexible component atop that can be provided by a soft slice). The TCSP can assemble a pool of resources based on slices obtained from different InPs. Based on the assembled pool of resources, the TCSP can then offer network services to VNOs, including a network slice within which the functions of a core network can be provided. It should be understood that in conventional Core Networks, functions such as the Home Subscriber Server (HSS) are a part of the CN, but in the decoupled architecture illustrated in FIG. 1, a database housing subscriber information may reside within the VNO network. The subscriber database may be instantiated upon resources that are obtained from the TCSP, but it may also reside in a subnetwork that can be accessible through the slice provided by the TCSP, but not strictly within it.

The resources allocated to a particular VN may be statically allocated, they can be varied along with demand in a dynamic fashion, or in a hybridized fashion as discussed above. The underlying physical resources can be allocated using either hard or soft slices so that the underlying physical resources can be statically committed or dynamically committed respectively.

Figure 2:
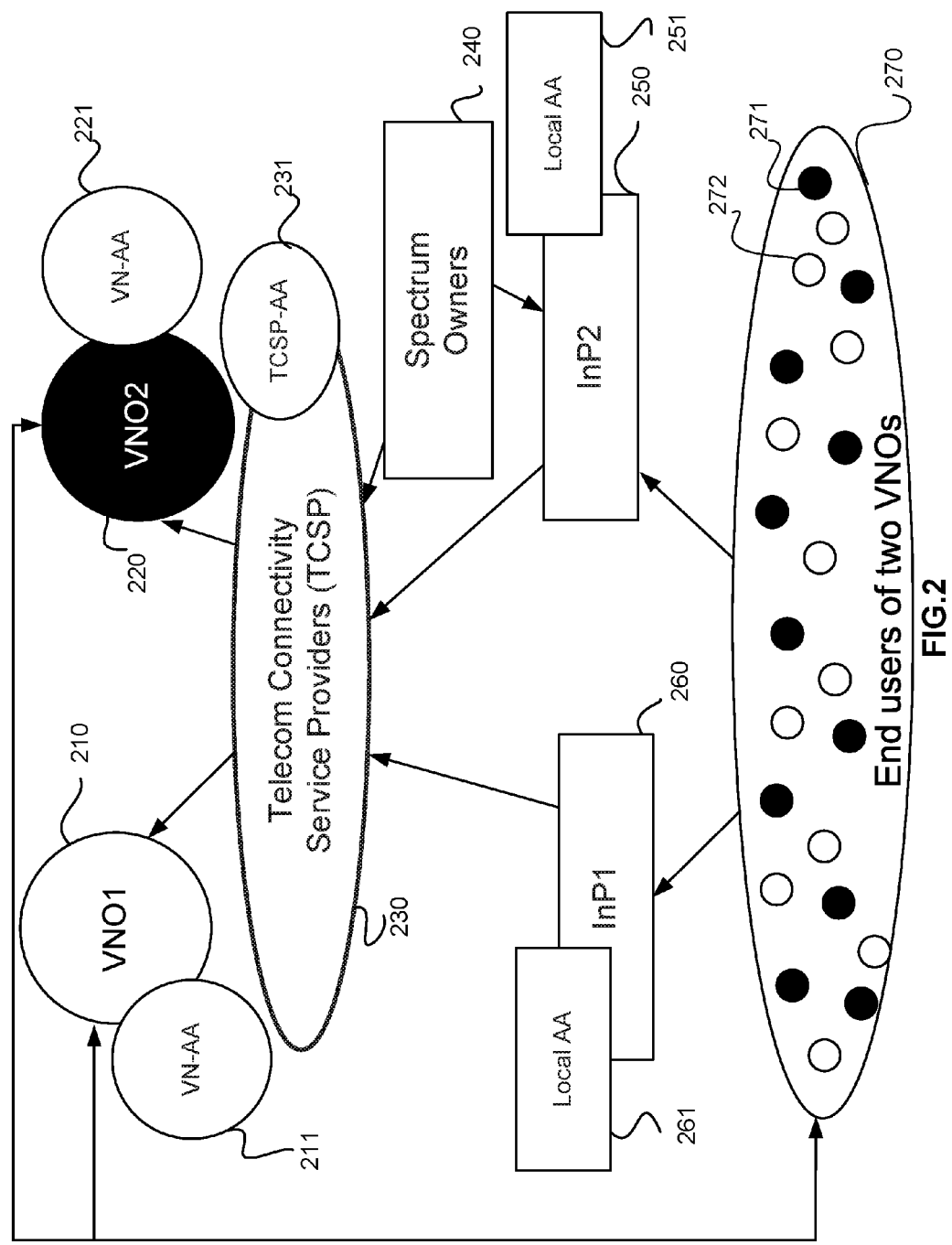
FIG. 2 is a block diagram illustrating relationships within a network architecture.

FIG. 2 further illustrates the decoupling of roles that may be found in future network archit. A pool of mobile devices 270 is served by VNO1 210 and VNO2 220. Mobile devices served by VNO1 210 are indicated by white elements 272 and mobile devices served by VNO2 220 are indicated by black elements 271. The term mobile device should be understood to refer to devices that can connect to a mobile network for service. The device makes use of a mobile connection whether the device itself is mobile. A prominent example of a mobile device is a user equipment (UE) such as a mobile network handset (e.g. a mobile phone). Other devices such as machine type communication (MTC) devices, also referred to as machine-to-machine (m2m) devices, are also examples of mobile devices. It will be understood that the terms mobile device and UE are used interchangeably, and use of one terms should not be construed as limiting As shown in FIG. 2, an Infrastructure Provider (InP) such as InP1 260 or InP2 250 provide Radio Access resources. The InP may not own the spectrum through which connectivity is provided, but instead may obtain the spectrum usage rights from a spectrum owner 240. Alternatively, an InP may be provided instructions from a TCSP to provide the TCSP with service in a defined spectrum band. The TCSP can either obtain spectrum usage rights from a government, or through an agreement with a spectrum owner 240. A Telecom Connectivity Service Provider (TCSP) 230 uses the resources obtained from an InP to provide Radio Access to the CN functions that it can provide. In some embodiments the InP provides a radio Access Network through which a users can access the networking functions provided by a TCSP to a VNO. In other embodiments, the InPs may provide some core network resources as well.

A VNO will typically include an AAF, shown as VN-AA 211 and VN-AA 221, configured to provide AA services. VN-AAA may include, or have access to, the Subscriber Database. The AAF will be understood to those skilled in the art to provide Authorization and Authorization services, such as those that would be provided by a 3GPP compliant Authentication, Authorization and Accounting (AAA) function. The omission of the Accounting function from the AAF should not be construed as a requirement that it not be present, but instead an understanding that accounting functions may be provided elsewhere, although they could be provided in the AAF. Where the 3GPP AAA function views authentication as the determination that a device presenting an identifier is the device associated with the identifier (the device is who it claims to be), it should be understood that in some embodiments of the AA function, authentication may involve user authentication in place of authentication of the UE. Authorization relates to determining whether an entity should be granted access to a requested service or resource. Authentication may also involve determination as to whether an authenticated identity or authenticated credential, is prohibited from access to a resource (e.g. through the use of a blacklist).

Those skilled in the art will further appreciate that the TCSP 230 can also include an AAF TCSP-AA 231 configured to provide AA services within the TCSP network. The TCSP AA may include AA data associated with subscribers to supported VNOs. This allows the TCSP to provide a AA services without requiring traffic to pass to the VNO domain, which may allow for faster AA processing. Further, each InP can include its own local AAF 251, 261 for providing AA services within the RAN. Because a mobile device connects to a RAN that may support a plurality of core networks, it may be advantageous to provide AA services within the RAN instead of exclusively within the CN. The Local AA instantiated within the InP may be a subset of the AA data of the TCSP. The TCSP AA data can be a combination of portions of the AA data of each VNO. If an InP provides service to a plurality of TCSPs, its local AAF can hold AA data that is a combination of portions of the respective TCSP AAFs.

The configuration and admission of a VN to a TCSP can be performed in any of a number of different ways, and the particular manner in which a VN is admitted to a TCSP is not germane to the following discussion. Embodiments will be discussed assuming a VN as already been configured and admitted. If the TCSP does not provide service to a VNO, and instead provides service directly to end users or customer groups, the TCSP AAF will hold the equivalent of the full VN AAF database.

For clarification, it is noted that a UE can be admitted, or individual sessions for an UE can each be admitted separately. It is noted that there are situations in which a UE can be admitted to a network for one type of session, but not another. For example, a UE may be admitted to a particular VNO to obtain a certain type of service (e.g. MBB or enhanced MBB (eMBB) services). The same UE may be rejected, by the same network, if it attempts to register for another service, such as a v2x (vehicular service) for which the UE has no subscription. In this scenario, it is noted, that the VNO may offer v2x services, but not have a registration for that UE. In other embodiments the UE may be able to negotiate to register for the v2x service. Or, the UE may be able to connect to a different VNO to get v2x services.

The process of admitting an an individual session, according to an embodiment, will now be discussed. The UE connects to the RAN provided by an InP. The InP provides resources to the TCSP upon which the VN associated with the UE is hosted. In this scenario, the VNO (e.g., VNO1 210) is associated with the TCSP 230. The TCSP 230 is makes use of RAN resources provided by the InP (e.g., InP 260). However InP1 260 is unassociated (i.e., has no contractual relationship) with VNO1 201. In other words a direct association between the VNO and the InP is not established. TCSP 230 is associated with both InP1 260 and VN01 310.

As part of transmitting a connection request, a UE supplies credentials which are used for an AA process. In some embodiments an admission control (AC) process also occurs. Three options, which will be referred to as Option A, Option B and Option C, are discussed below. It will be well understood by those skilled in the art that these examples are not intended to be exhaustive. Briefly, the AA process can be carried out in a distributed fashion by different entities within the network, and even by entities within different network domains. The AA process includes an admission check that can include authentication and authorization, as discussed above.

In one embodiment of Option A, the AA process be carried out exclusively by VN AAF 211. Option A provides the VNO with full control over the process, as Option A does not involve delegation of any rights or the release of any data. An offsetting cost for this control is that the AA process will typically have more latency due to the messages for the AA process traversing multiple network domains.

In an embodiment of Option B, VNO1 210 can delegate AA functions to the TCSP 230. This may be done to reduce the overhead required of VNO1 210, and will make use of the TCSP AAF 231. However, there is still a layer of latency created in such an arrangement as InP1 260 must pass data for authentication and authorization to the TCSP 230. Additionally, it requires that VNO1 210 provide the TCSP 230 with sufficient information to process at least one AA function. This requires a trust relationship that may not always be possible. Where a VNO makes use of a plurality of TCSPs (not shown), this option may result in AA information being shared with multiple TCSPs. The TCSP is likely to already be running an AAF. The AA data can either be pre-loaded into the TCSP AAF, or the TCSP AAF can be populated with AA data every time that an individual user or UE is authenticated and/or authorized. This gradual building of the AAF data allows the VNO to release data only as needed. The data stored in the TCSP AAF may expire and be deleted after a reasonable expiry time to reduce concerns about data security.

In an embodiment of Option C, the AAF (or a part thereof) can be located within InP1 260. Having the local AAF 261 will typically provide the lowest latency (which directly impacts admission times) but requires the greatest number of AA delegations by VNO 1 210. It should also be understood that different parts of the AA process could be carried out at different entities.

The VNO may choose to use a TCSP or InP instantiation of an AAF (for example using an AA Virtual Machine (AA VM). This allows for the AAF to be located in the TCSP, but the AAF is controlled by the VNO. The VNO may use an AA instantiated by the TCSP for its needs, or it may have its own. The VNO-TCSP agreement may allow the TCSP to have an AAF instantiated within the TCSP to perform AA functions on behalf of the VNO. Alternatively, the TCSP may push the VNO Authentication data into a TCSP controlled AAF to allow for faster AA processing. The TCSP AAF may support all the VNOs supported by the TCSP.

The AAF could also be pushed down to an InP (optionally with limited user data) to allow for faster AA responses. This could allow for an AAF to be instantiated at the edge of the network with limited data sets. When a UE connects to an edge node for the first time, data relevant to its authentication can be moved into an AAF instantiated in the InP that owns the equipment that the UE is attaching to. Instead of a large number of network operators and service providers pre-loading an InP based AAF with user data that may never be used, AA data associated with a UE that has attached to an InP AP, can be cached by (or simply pushed to) the InP AAF. This will reduce the latency of any further AA processes. In any situation in which the AAF is outside the VNO domain, limited AA data can be provided to the AAF. Subscription and other data relating to the VN can be exclusively held by the VNO if so desired.

If a UE fails an AA process the Attach Request can be rejected or access can be denied. There are other circumstances in which a UE will be blocked, which typically relate to resource allocation. For example, if an InP is overloaded, it may reject a UE attach request. Similarly, if the resource allocation of a VNO has been exceeded, a TCSP may reject the session. Generally speaking, when a new user/session successfully proceeds through an AA process, it will be admitted unless network capacity does not allow it.

In addition to AA, Monitoring and Policy control (M&PC) functions such as traffic Monitoring (M) and Policy Control (PC) may also be pushed to the InP. For ease of illustration, M&PC will be used to also generally include Admission Control (AC) and Traffic Control (TC), but it should be appreciated that these functions may be split up and administered by different network elements. Indeed, in some options the AAF can be subdivided, with Authorization, Authentication and Accounting being performed by different network elements. In some embodiments, one or more of these functions may be dynamically controlled and moved between network elements and/or different layers of the network. In some embodiments, an admission check can include authentication, authorization and admission control, which need not necessarily be performed by the same functions. In this context, admission control refers to the checking sufficient network resources are available to satisfy the request. In some situations, a connection request can be authenticated and authorized, but cannot be admitted due to a lack of resources to deliver the requested service.

Figure 3:
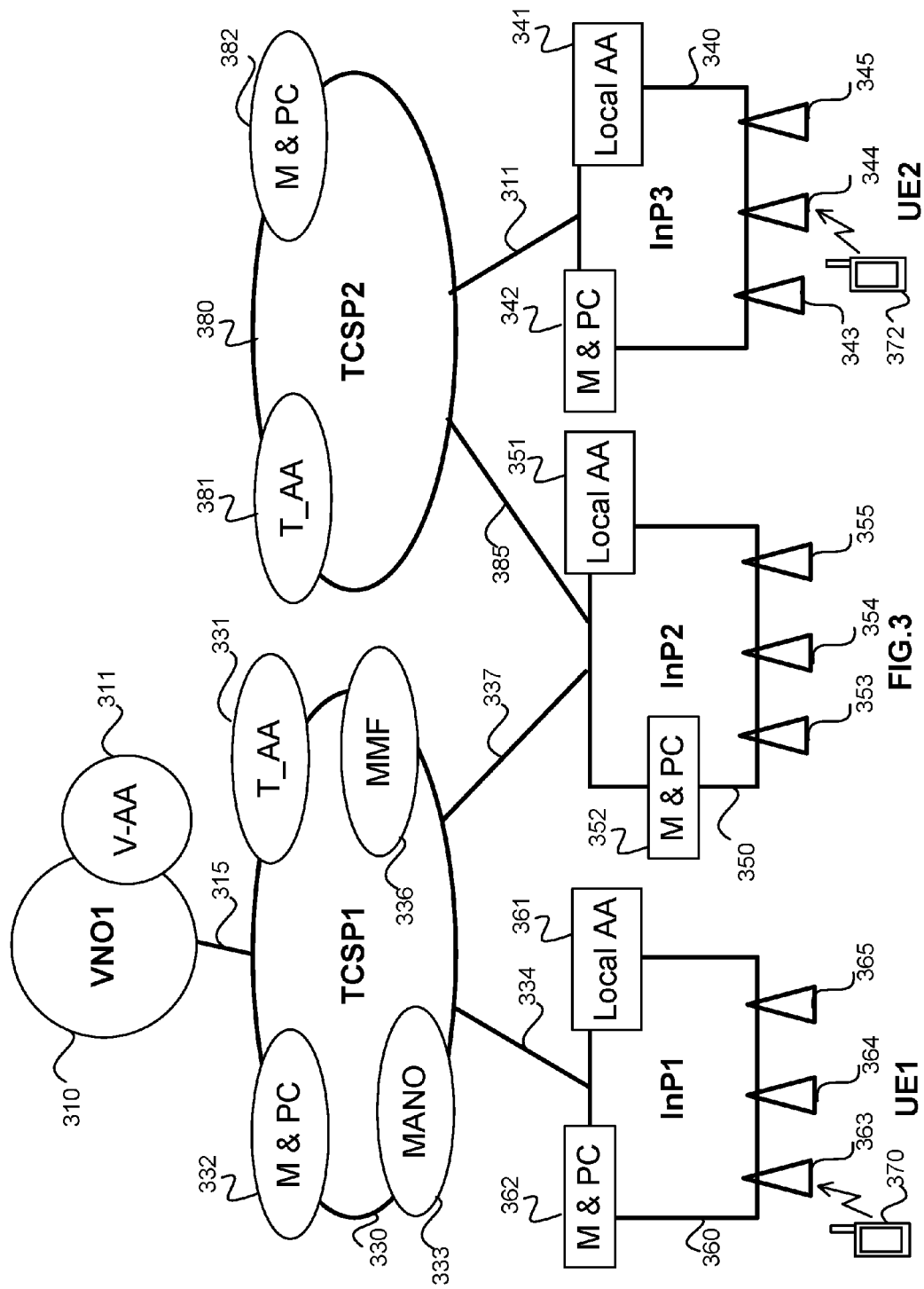
FIG. 3 is a block diagram illustrating relationships within a network architecture.
Figure 4:
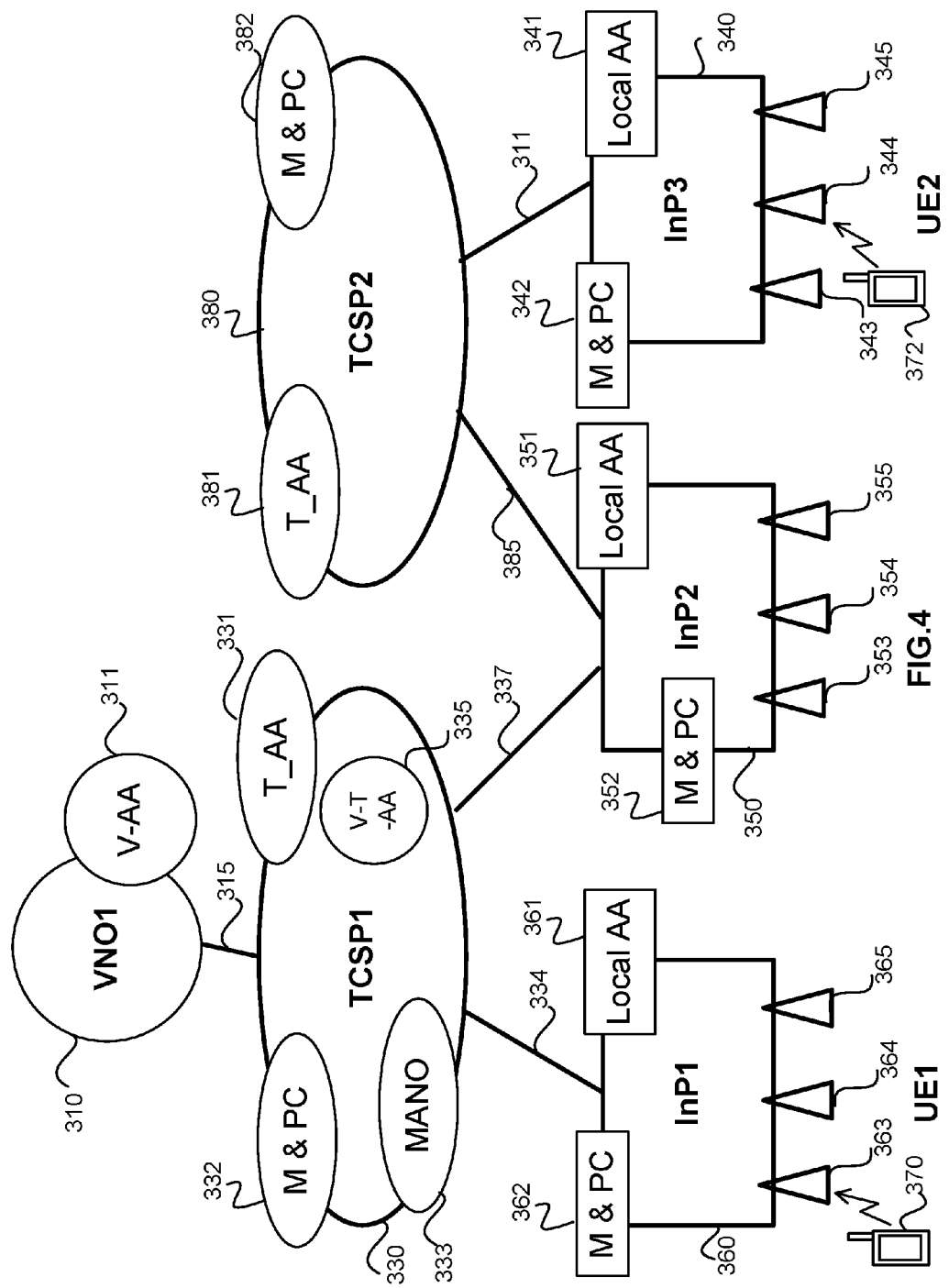
FIG. 4 is a block diagram illustrating a second set of communications within the relationships of the network architecture (referred to as option B).
Figure 5:
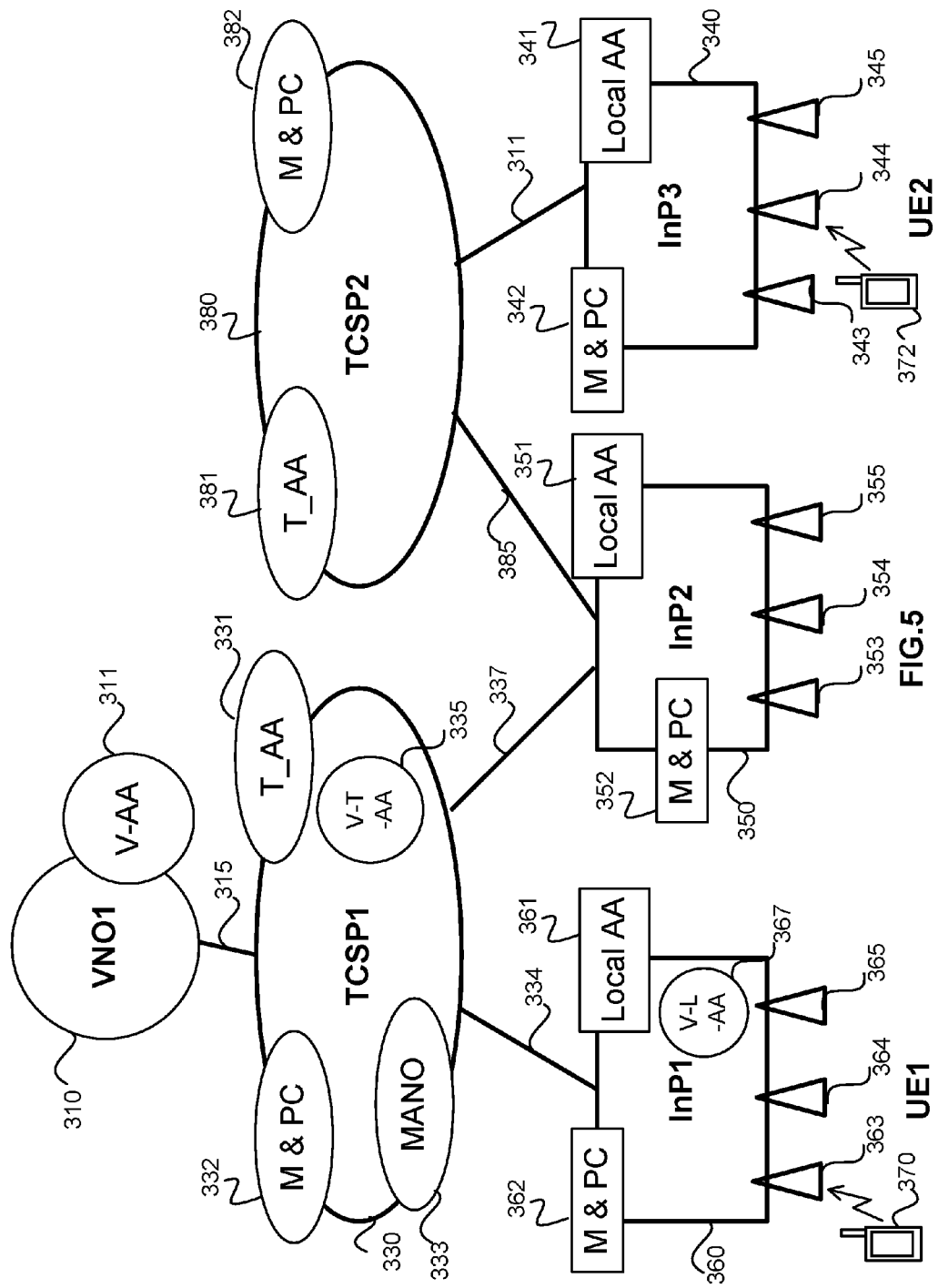
FIG. 5 is a block diagram illustrating relationships within a network architecture (referred to below as option C).
Figure 8:
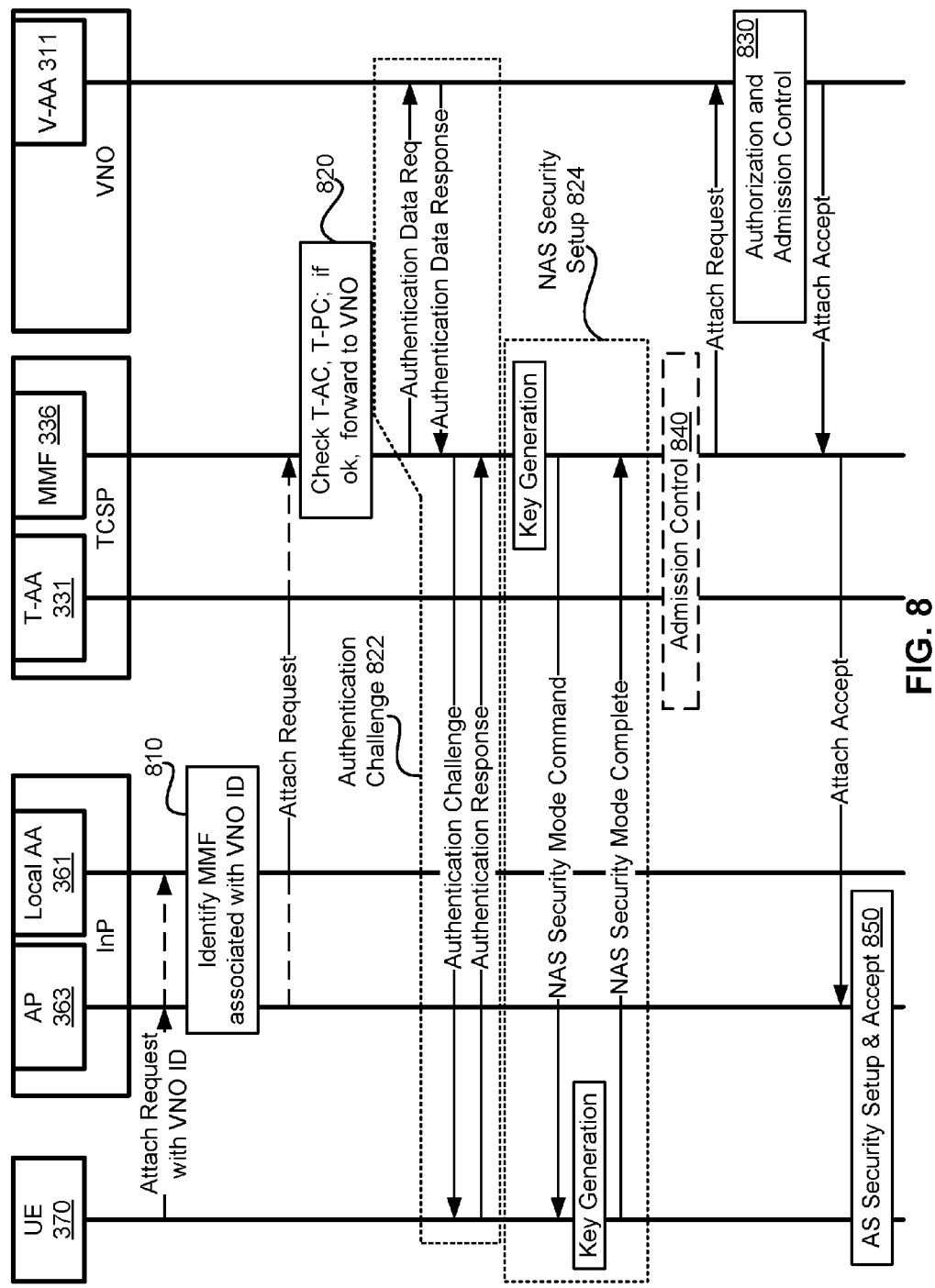
FIG. 8 is a message flow diagram illustrating message flows used in a first attach process.
Figure 9:
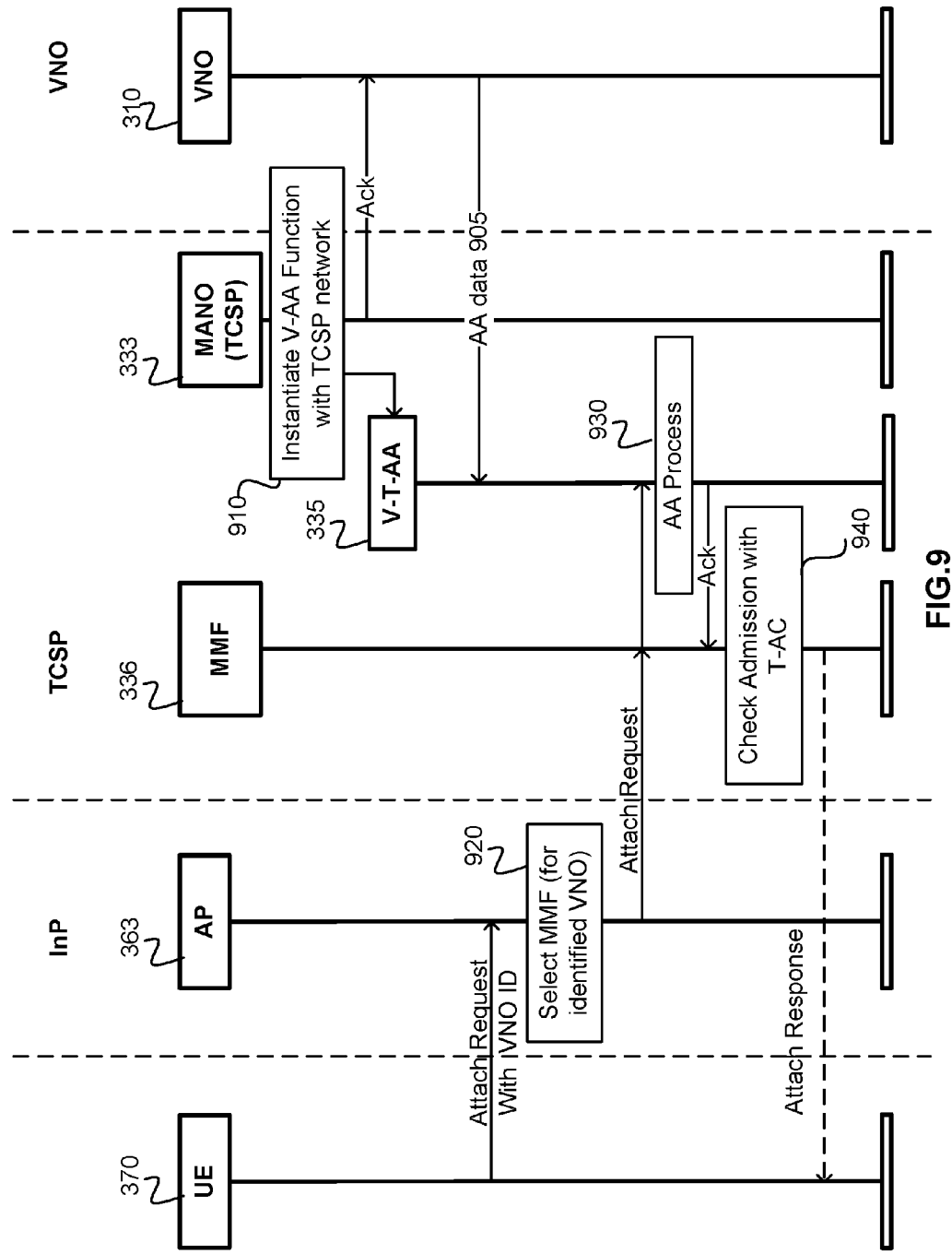
FIG. 9 is a message flow diagram illustrating message flows used in a second attach process.
Figure 10:
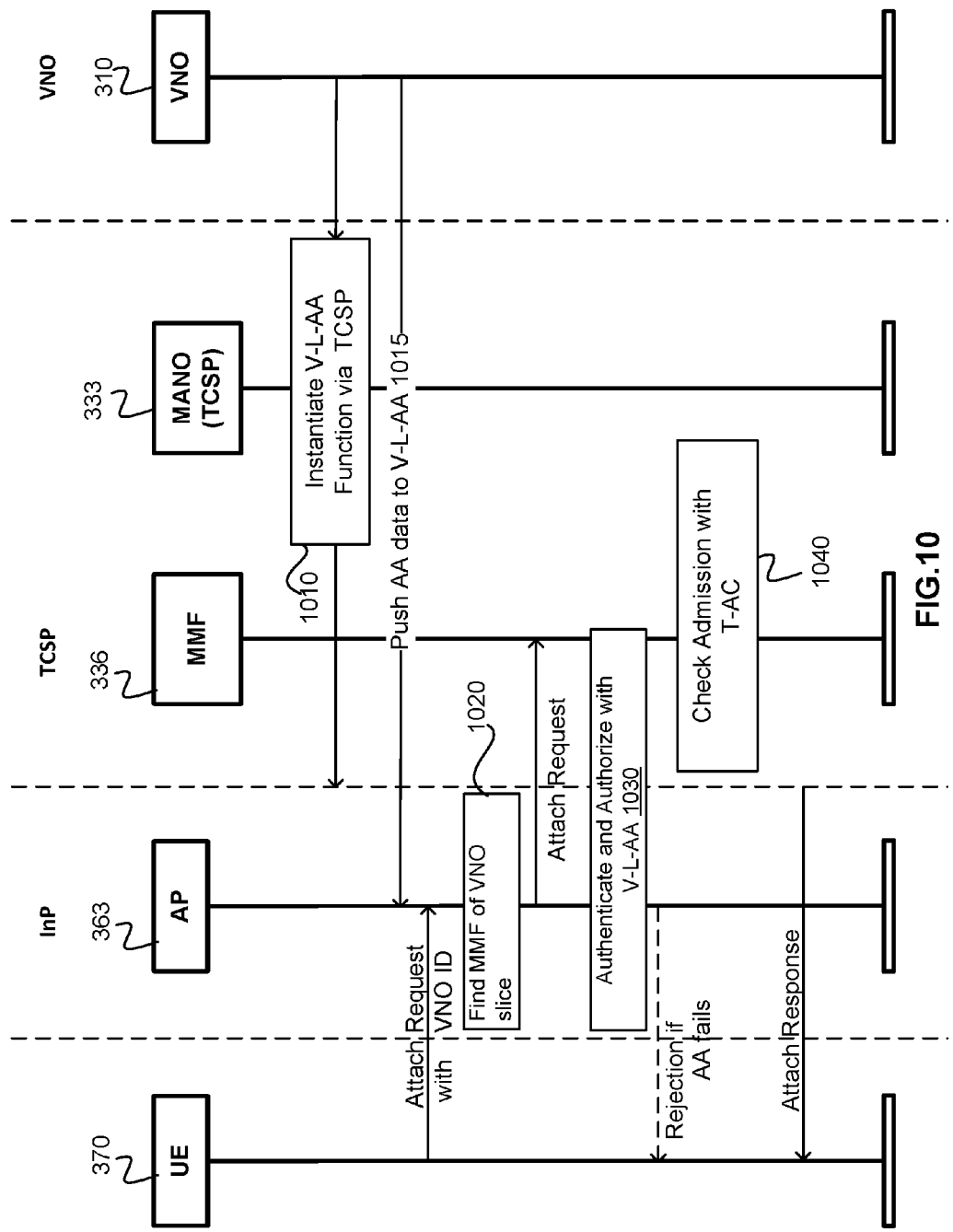
FIG. 10 is a message flow diagram illustrating message flows used in a third attach process.

FIGS. 3-5 are block diagrams illustrating a possible network layout useful for illustrating several admission options for a single session for a User who is already a subscriber of a VNO. As discussed above, embodiments will be discussed in relation to three options:

Option A: the VNO maintains AA data and functionality within a VNO function, labeled as V-AA, and discussed generally with reference to FIG. 3 and FIG. 8;

Option B: the VNO may distribute AA data and functionality to a TCSP function, labeled as V-T-AA, and discussed generally with reference to FIG. 4 and FIG. 9; or Option C: the VNO may request the TCSP to distribute AA data and functionality the InP, and labeled as L-V-AA and discussed generally with reference to FIG. 5 and FIG. 10.

FIG. 3 illustrates an architecture in which VNO1 310 is associated with TCSP1 330. The association between VNO1 310 and TCSP1 330 is schematically illustrated via line 315. TCSP 1 330 in turn has associations 334, 337 with InP1 360 and InP2 350 respectively. InP2 350 also has an association 385 with TCSP2 380. TCSP2 380 is unassociated with VNO1, but does have an association 311 with InP3. TCSP 1 330 has its own AAF, T_AA 331, and M&PC function 332, which perform these functions for TCSP 1 330. Similarly, TCSP2 380 has its own AAF (T_AA 381) and M&PC function 382. InP 1 360 has its own AAF, Local AA 361, and M&PC function 362 as well as physical infrastructure such as access points (APs) 363, 364 and 365. InP 2 350 has its own AAF, Local AA 351, M&PC function 352 and APs 353, 354 and 355. InP 3 340 has its own AAF, Local AA 341, M&PC function 342 and APs 343, 344 and 345. While not necessary, it is assumed that each InP provides access services to more than one TCSP, thus justifying operating its own AA and M&PC functions. However, should an InP be owned by or solely dedicated to a TCSP, it may forgo operating its own AA and M&PC functions, and use those of the TCSP. Not every InP will support AA functions (e.g., a picocell network operated by the building management of an office building may not support a local AA function). In some implementations, the local AA functions can be very simple, and upon receipt of an AA request it can forward the request to another AA entity. TCSP will also include other functions such as, gateway functions and mobility management functions along with other functions that will be apparent to those skilled in the art. In the context of an LTE network, the gateway function could be one of a Serving Gateway (S-GW), or a Packet Gateway (PGW), and the Mobility Management Function (MMF) could be the equivalent to a Mobility Management Entity (MME). TCSP1 330 also includes an MMF 336. If NFV is utilized then TCSP1 330 can also include a MANO 333 for instantiation VFs. As another example, if NFV is utilized, then v-u-GWs (not shown) may be used.

Figure 6:
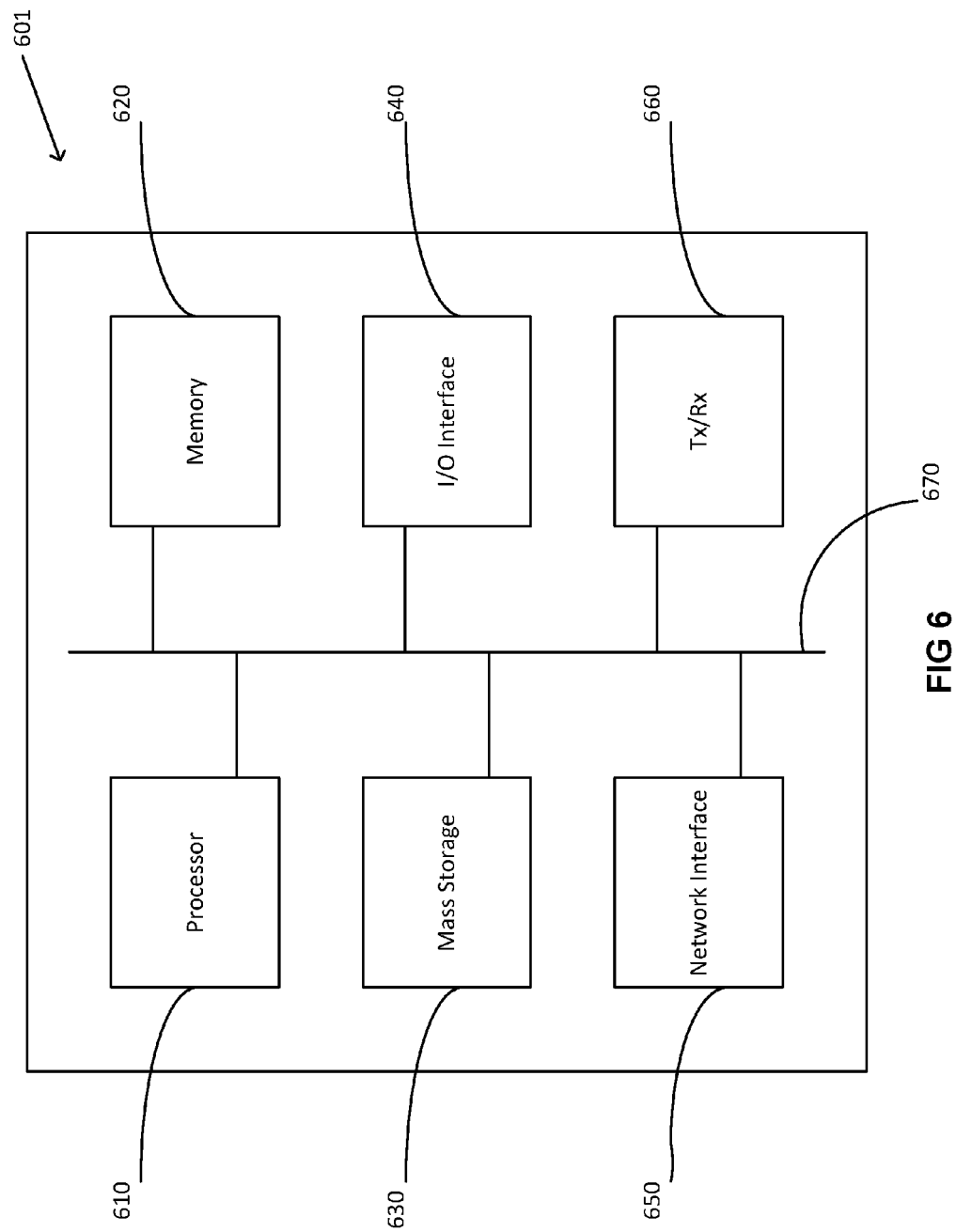
FIG. 6 is an block diagram of a host processing system according to an embodiment that may be used for implementing the various network functions.

For each of FIGS. 3-5, the following convention is utilized. Circles represent a VNO as well as VNO controlled or located functions. Ovals represent TCSPs, or TCSP functions. Rectangles represent InPs and InP located functions. This convention helps illustrate that the VNO can delegate functionality (by supplying or controlling the functions or the data which they utilize) to different layers of the layered network. It should be appreciated that each of the functions can be executed by one or more hosts. A host can be a computer or network element which include a processor and machine readable instructions which when executed by the processor, implement the function. FIG. 6 is an exemplary block diagram of a host processing system 601 that may be used for implementing the various network functions, which will be discussed further below.

For each of the 3 options (i.e., option A, option B and option C), embodiments are discussed for two scenarios for situations where both UE1 370 and UE2 372 are subscribers of VNO1:

Scenario 1: Session admission when UE1 370 connects to InP1 360; and Scenario 2: Session admission when UE2 372 connects to InP3 340 (which is unassociated with a TCSP associated with VNO1 310).

An embodiment implementing Option A, in which VNO 1 310 maintains control of the AA data and functionality, will now be discussed with reference to FIG. 3. In Option A, AA processes are not delegated to the TCSP or the InPs. Rather, the VNO 1 310 maintains AA functions within V-AA 311. As an alternative, for embodiments in which the TCSP implements network slicing, the AA functions can be instantiated in the TCSP's resource (processing) slice for this VN. In one embodiment, the Admission Control (AC) is done by the VNO based on the state of the network slice. For example, based on remaining capacity or other abstracted feedback from the TCSP. In another embodiment, after authentication and authorization is performed by the AA of the VNO, the AC decision is performed by M&PC function 332 of TCSP1 330 at its discretion based on current network loading and policy. In this case, M & PC function 332 receives policy & monitoring guidelines from the VNO and establishes its own policies based on its utility (cost/network state, QOE requirements and requirements specified by the VNO, etc.).

Scenario 1 for Option A will now be discussed. According to an embodiment, UE1 370 connects to AP 363 which is operated by InP1 360. UE1 370 transmits an attach request that includes its ID and its VNO1 subscription ID to initiate the request for connectivity. The attach request can be forward by AP 363 to local AAF 361 if it has been instantiated. Local AA 361 tries to authenticate the UE. There are three possible results: success, rejection and cannot authenticate. Success occurs when the local AA has the information required to authenticate the UE, and the UE has the credentials to be authenticated (in which case the authentication process is completed). Rejection occurs when the local AA has the information required to authenticate the UE, but the UE doesn't have the credentials and thus this process ends. Cannot authenticate occurs when the local AA 361 does not have the information required to authenticate to make a decision. In some scenarios, AP 363 can determine from the VNO subscription ID provided in the attach request that the authentication process cannot be carried out locally. In such a scenario, it can simply have the AA processed pushed to the TCSP.

Because local AA 361 cannot authenticate the UE, the attach request is pushed to either the TCSP or the VNO. Accordingly InP1 360 forwards the request towards V-AA 311, typically by sending the request to T-AA 331. T-AA 331 will be unable to complete the authentication and will then forward the request to V-AAF 311. V-AAF 311 authenticates the user and sends security keys and authorised user category details to TCSP1 330 as per the service agreement establishing the VN. The TCSP1 330 sends AA info and policy and monitoring requirements to InP1 360. The InPs which provide the service may be chosen or changed based on the location and any subsequent movement of the UE. For example the service may be allocated to AP 353 of InP 2 350. In some embodiments which utilize Network Function Virtualization (NFV) such a setup may include instantiating virtual entities, such as a virtual user specific serving gateway (v-u-SGW) and may include the instantiation of other virtualized functions, for example in TCSP1. Upon termination of the session, termination information is sent to the VNO1 310.

FIG. 8 is a message flow diagram illustrating message flows according to an embodiment for this scenario. In the illustrated scenario the VNO 310 has a service agreement with the TCSP 330. Upon receiving a request from UE 370, the AP 363 checks the VN ID, determines 810 the correct function (e.g., MMF) responsible for the connectivity management for the UE 370 and sends the attach request to that function (e.g. MMF of the TCSP 330). The AP 363 may forward the Attach request to its local AA 361. The Local AA 361 cannot authenticate the UE, so it sends the request to the TCSP. The request can either be sent directly to the MMF 336, or to the MMF 336 via the T-AA 331. In embodiments which utilize network slicing, this could be an MMF associated with the VNO service slice established within TCSP 330. When a UE connects to an AP that is shared among a plurality of TCSPs, the AP can select a TCSP associated with the VNO providing service to the UE There can be a hierarchical list of TCSPs associated with each VNO to allow the AP to select a single TCSP when both the VNO and the InP share a plurality of common TCSPs. It will also be understood that different methods of selecting a TCSP from a set of TCSPs associated with a VNO can be used. In one embodiment the MMF checks with a TCSP Access Control entity (T-AC) and/or a TCSP Policy and Charging entity (T-PC), both of which may be part of M&PC function 332 or separate functions, to assess network resource availability. In embodiments which utilize network slicing, slice resource availability will be assessed. Accordingly, in some embodiments M&PC 332 determines 820 if the request should be rejected based on policy prior to authentication of UE 310. Upon confirming that there are sufficient resources and no policy based reason to reject the connection, the MMF starts the Authentication Challenge process 822. Those skilled in the art will appreciate that the Authentication challenge 822 is similar to that carried out in LTE networks. The Authentication data request is transmitted to the V-AA 311 but could be sent to any node with UE authentication details, such as an HSS, or in cases where other AAFs are acting on behalf of the V-AA 311, the other AAFs. Upon completion of the Authentication Challenge 822, the MMF 336 can be assured the UE has been authenticated to the level required by the VNO. It should be noted that the call flow illustrated is similar to the process used in existing 3GPP networks to authenticate a UE. In some embodiments, authentication can be performed on a user instead of on the UE. In such embodiments, The Authentication Data Request can be forwarded from the AAF to a third party authentication entity so that an authentication challenge can be obtained. In other embodiments, the authentication of a user is enabled by creating a session between the third party authentication function and the UE, allowing the user to provide authentication credentials. The result of the user authentication can be provided to the MMF either from the UE or the third party authentication function. As shown in FIG. 8, following Authentication challenge 822, an NAS Security setup process 824 can be undertaken. This process will be understood by those skilled in the art to allow for a secure connection to be created between the MMF 336 and the UE 370. The attach request (for the authenticated UE) is then forwarded y MM336 to V-AA 331. The V-AA 311 performs authorization and admission control 830. AC can be performed by a VNO Access Control entity (V-AC) (which may be part of V-AA 311 or a separate VNO function). As an alternative, VNO 310 can perform authorization alone. This is particularly suitable if the VNO 310 only makes use of the resources of a single TCSP. In such a case, T-AC (which may be a function within an MME or within the T-AA 331) can perform the AC process 840 based on the available resources for the VNO and VNO admission control policy. It should be appreciated that in some embodiments, AC is only checked once (for example at step 820 or 840). In other embodiments, step 820 provides an AC check based on a first threshold based on slice/network availability. If the network or slice has insufficient capacity, the admission will be rejected. If the network or slice has limited capacity, then the decision to admit the session can depend on policy, for example, based on UE and/or VN priority etc). In which case, a second AC check is made after the authentication and authorization check 830. Attach acceptance is sent back towards the UE 370. AP 363, upon receipt of an indication that the UE has been admitted, can perform an AS Security setup and forward the attach acceptance in process 850. The AS Security setup allows for a secure connection between the admitted UE 370 and the AP 363.

For embodiments in which TCSP provides the resources upon which the VNO operates in the form of a slice, the Attach Request can include a slice ID. If the UE 370 does not provide the slice ID, but identifies the VN, the AP 363 may be able to ascertain the TCSP and the slice ID, for example via a look-up table or the like. In some embodiments the TCSP may allocate a slice to more than one VN (i.e. the resources of the slice are shared by a plurality of VNs), in which case the request can include both the slice ID and the VN ID. If the TCSP does not implement networking slicing, than AC will typically depend on availability of resources generally, as opposed to availability of resources allocated to the VN slice.

Scenario 2, in which UE2 372 connects to InP3 340 (which is unassociated with a TCSP associated with VNO1 310) will now be discussed with reference to FIG. 3. UE2 372 connects to an AP 344 operated by InP3 340 requesting a network connection. UE2 373 is a subscriber of VNO1 310. AP 344 transmits a connection request to local AA 341 in InP3 340. The authentication request may include the UE ID and a subscription ID that identifies at least one of VNO1 310 and TCSP1 330. Local AA 341 cannot authenticate UE2 372. Local AA 341 cannot forward the request to an AAF that can process it. InP3 340 and its instantiated functions are unable to authenticate UE2 372 or connect it to VNO 310. Accordingly InP 3 340 forwards the request to T_AA 381, which is the AAF of TCSP2 380. T_AA 381 forwards the request to T_AA 331 of TCSP1 330, which in turn forwards the request to V-AA 311 of VNO1 310. The message forwarding may utilize a basic service (in jurisdictions which mandate a free basic service) or costs may be paid by VNO1, UE2 or some other entity. If provided as a basic service, UE2 may be authenticated by a centralized authentication server to avoid potential abusive behavior, and typically prevents overuse, or participation in a DDoS. Once admitted by VNO1, VNO1/TCSP1 may request TCSP2 provide service on an on-demand basis, and charge for the service on that basis. Alternatively VNO1 may establish a new contract with TCSP2 in anticipation of more of its users requesting service from TCSP2.

V-AAF 311 of VNO1 310 authenticates the user and sends security keys and authorised user category details to TCSP2. TCSP2 380 grants admission and sends AA info and M&PC requirements to its InPs. Additionally, Gateway, MMF and other functions (not shown), including other virtualized functions, may be utilized as required. Upon termination, the termination information is sent to the VNO1/TCSP1.

When a UE connection through InP3 is accepted, the Telecommunication Connectivity Services provided by the TCSP still need to be provided. TCSP1 and TCSP2 can coordinate the set-up and selection of paths through which data can flow from InP3 into TCSP2 into TCSP1 and then to VNO1. The paths may be from InP3 directly into TCSP1, or paths set up as tunnels (or other such constructs) within TCSP2 that let traffic route from InP3 into TCSP1, possibly through functions that are being provided by TCSP2.

A variety of different mechanisms can be used when a UE connects to a Radio Access Network (such as InP3) and does not have a subscription that would allow the UE to be authenticated. These mechanisms are not germane to the authentication of either a UE or a user and the subsequent admission of the UE session based on a subscription.

An embodiment implementing Option B, in which the VNO delegates AA database content and AA functionality to the TCSP V_T_AA 335, will be discussed generally with reference to FIG. 4. Again scenario 1 and scenario 2 will be discussed. FIG. 3 differs from FIG. 4 by the addition of TCSP function V_T_AA 335. It is noted the V-T-AA 335 is illustrated with a circle to represent that it is a VNO supplied function within the oval TCSP1 330. The instantiation of V-T-AA 335 within TCSP1 330 can be achieved in a number of different ways. V-T-AA 335 can be instantiated as a standalone function that is reachable by T_AA 331. This allows much of the signaling of FIG. 8 to remain intact. Any communication between T_AA 331 and V-AA 311 would be through V-T-AA 335. This standalone instantiation can either build its own AA database as UEs connect, or it can replicate part or all of the AA database accessed by V-AA 311. Alternatively, V-T-AA 335 can be instantiated within T_AA 331. This would provide T_AA 331 with access to at least a subset of the AA data accessible to V-AA 311. In some embodiments the VNO1 310 delegates authority to TCSP1 330 to make admission decisions, and V_T_AA 335 represents the VN AA data downloaded or otherwise provided by VNO1 310 to the T_AAF 331. In other embodiments, V_T_AA 335 represents a virtual AAF instantiated by VNO1 310 within a TCSP1 330. Utilizing such a virtual AAF enables VNO1 310 to maintain more control than delegating the decision making authority to TCSP1 330, while still reducing the latency compared to Option A. In some embodiments, V_T_AA 335 will be established at time of the VN set up, and can be updated at intervals determined by VNO1 310. It should be noted that for ease of illustration, MMF 336 is not shown in FIG. 4, but it should be appreciated that such a function can still be utilized.

The process of UE1 370 attaching to the network (Scenario 1) will now be discussed. UE1 370 connects to AP 363 in the RAN provided by InP1 360 which forwards the received Attach Request to Local AA 361. The Attach Request can includes the UEID and an identification of VNO1 as the VNO to which the UE is subscribed. In some embodiments, InP1 will direct all authentication requests to local AA 361. When Local AA 361 is unable to decisively authenticate (either authenticate the UE or determine that the UE is not the entity it claims to be) UE 370, it forwards the request to T_AA 331. If T_AA 331 can decisively authenticate the UE it will. Otherwise, in embodiments in which V-T-AA 335 has been instantiated to allow for isolation of the VNO authentication data, T_AA 331 forwards the request to V-T-AA 335.

In some embodiments, the InP may be instructed that all authentication is to be done at either TCSP1 or VNO1. In which case the AP can be instructed to forward the request toward T_AA 331. Alternatively, InP1 may implement this requirement by putting the instruction in Local AA 361. When the request to authenticate is received the AP will send the request to Local AA 361, which will send the authentication request to T_AA 331 without attempting to authenticate the UE.

In some embodiments, AP 363 or Local AA 361 will transmit the attach request to T-AA1 331 which processes the request using V-T-AA 335. In other embodiments T-AA1 331 forwards the request to V-T-AA 335 for processing. V-T-AA 335 grants admission and informs InP1, by providing AA info and M&PC requirements to InP1. Other embodiments may provide the authorization to other InPs as required, for example based on the mobility of the UE. Once again the actual APs which provide the service may be chosen or changed based on the location and any subsequent movement of the UE. Additionally, S-GW and MMF functions, which along with other functions may be provided through virtualization, may be set up at desired locations. Monitoring information may be sent during the session to VNO as per the SLA. Upon termination, the termination information is sent to the VNO1.

FIG. 9 is a message flow diagram illustrating message flows for enabling the above discussed embodiment. FIG. 9 also illustrates message flows for an embodiment involving a virtualized AAF instantiated in a host of the TCSP, which will be discussed below with reference to FIG. 8. The process begins with the instantiation of VNO1 310 instantiates 910 V-T-AA 335 within TCSP 310.The instantiation of a function within the TCSP network can be performed by a MANagement and Orchestration (MANO) entity such as TCSP MANO 333. In response to an instruction to instantiate a virtual AAF within the Core Network domain provided by the TCSP, MANO 333 instantiates a new AAF (V-T-AA 335). MANO 333 transmits an acknowledgement of the instantiation of V-T-AAA 335 to the requesting entity (shown as VNO 310). An entity within VNO 310 can then push AA data from the V-AA 311 to the V-T-AA335 in flow 905. This process can be performed a per VN slice basis, if network slicing is implemented. V-T-AA Can receive further AA data updates during operation.

UE 370 transmits an Attach Request to AP 363. The Attach Request optionally includes the VN ID. The AP 363 selects an MMF for the request 920. The selection of the MMF can be done using the VNO ID if it is included. The InP does not attempt to perform authentication on the UE 370, and forwards the request to the selected MMF 336. The MMF 336 can be VN slice specific, if VNO 310 is created through network slicing. The MMF 336 selects the responsible AAF, in this case V-T-AA 335 and requests Authentication and Authorization. The AA process 930 is then carried out. Although the AA process is shown as being carried out by V-T-AA 335, MMF 336 may send the Authentication request to T-AA which can either forward it to V-T-AA 335, or T-AA can perform the authentication process itself using the data available to V-T-AA 335. As noted with respect to FIG. 8, the AA process 930 may an authentication challenge like 822 and a NAS security setup 824. Upon authenticating UE 370, V-T-AA 335 provides the authentication result to the MMF 336 which can perform an admission control check 930. AC 930 may be performed by a T-AC component of M&PC function 332 or by a dedicated T-AC function. A response to the Attach Request is then sent to the UE 370 through AP 363. Those skilled in the art will appreciate that the Attach Response transmission may be included within an AS Security Setup similar to that of 850.

FIG. 5 illustrates Option C. In Option C, VNO AA data can be pushed to either or both of the TCSP and an InP. Distribution of the AA data can be achieved through either making a subset of the AA data available, or by having an AAF instantiated within the RAN provided by InP 1 360. The AAF instantiated within InP1 360 is illustrated as V-L-AA 367. It is noted that V-L-AA 367 is shown as a circle to illustrate that it is a VNO function (albeit one that may be instantiated by a MANO 333 of the TCSP 330, or by a MANO of the InP in response to a request from MANO 333). The V-L-AA 367 could be co-located with the AP. Alternatively V-L-AA 367 can be located in the InP network and connected to a one or more APs, without it being instantiated within a given AP. It should be noted that for ease of illustration, MMF 336 is not shown in FIG. 5, but it should be appreciated that such a function can still be utilized The Attach process for a UE with AA data in a V-L-AA function will now be discussed. UE1 370 sends an attach request to AP 363 associated with InP1 360. The request includes the UE ID and a VNO identifier. The VNO identifier indicates to AP 363 that the authentication of the UE can be performed within the RAN provided by the InP. AP 363 forwards the Attach Request to either the Local AA 361 or the V-L-AA 367 depending on how the V-L-AA 367 has been instantiated. Authentication and authorization for access to the VNO is provided within the RAN. The InP1 360 informs the TCSP1 330 about the admission request and provides capacity information about the availability of resources. The TCSP1 330 confirms that the session can be admitted. The remaining steps are same as above. It should be understood that the InP can either receive data for inclusion in its AA service, or it can, upon receipt of an attach request, instantiate an AAF on behalf of the VNO. This would result in a V-AA instance in an InP node, such as an access point (e.g., an eNodeB) or within the same node or set of nodes used to instantiate Local AA 361. This can provides control of the AAF to the VN (depending on the nature of the instantiation), while providing the AAF in the closest location to the UE possible.

FIG. 10 is a message flow diagram illustrating message flows according to an the above described process. FIG. 10 also illustrates message flows for an embodiment involving a virtualized AAF instantiated in the AP. The VNO 310 transmits a request for instantiation of the V-L-AA within the RAN provided by the InP. This may involve transmitting a request to the TCSP MANO 333. If MANO 333 can instantiate functions within the InP, it transmits an instruction to instantiate. In FIG. 10, this message is transmitted to the AP so that the V-L-AA can be instantiated at the radio edge. In other embodiments the TCSP MANO 333 can instruct the instantiation of the V-L-AAA in other locations. In embodiments where the TCSP MANO 333 cannot directly control instantiation of functions within the InP domain, the request can be forwarded to an InP MANO which would then in turn manage the instantiation of the V-L-AA. If NFV is not being employed, this step can be omitted. In step 1015 VNO 310 provides relevant AA data to the InP based AAF (e.g. V-L-AA).This exchange of data may be done through TCSP1 330 which is the normal intermediary between the InP and VNO, or in response to the instantiation of the V-L-AA in 1010, the MANO can provide addressing information for the instantiated function to the VNO to allow for a direct connection. The UE 370 transmits an attach request to the AP. The attach request optionally includes the VNO identifier. The AP can determine that the AAF that can authenticate the UE is in the InP RAN. This determination may be performed at the same time as the identification of the MMF in the relevant TCSP in step 1020. The attach request is forwarded to the selected MMF, and the MMF and the V-L-AA then perform the authentication and authorization process 1030. Upon successful authentication and authorization, Admission Control 1040 can be performed. The successful attach response is then sent back to the UE. Those skilled in the art will appreciate that processes 822 and 824 can be carried out, with the MMF 336 contacting the V-L-AA for the authentication data request, as a part of process 1030.

Figure 7:
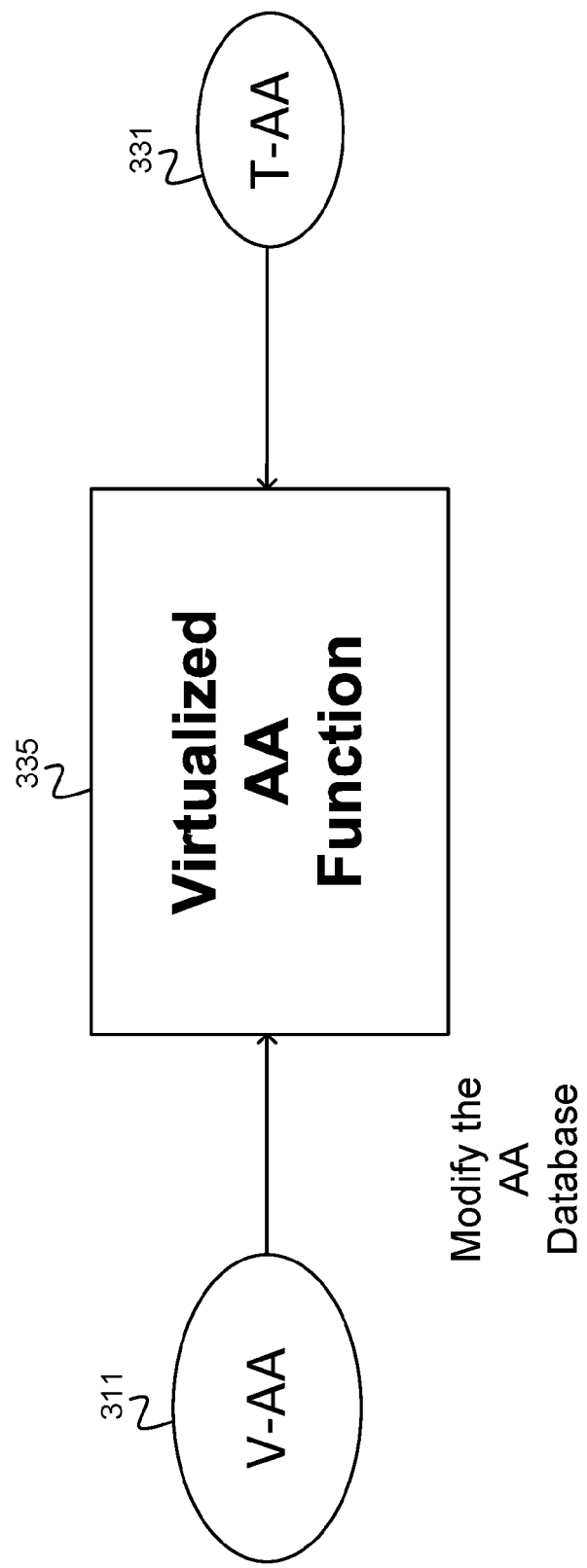
FIG. 7 is a block diagram illustrating data flows used in the establishment of a Virtualized AAF.

As stated, in some embodiments the VNO can keep control of its AA functionality and information by instantiating a customized virtual function in TCSP 330. Accordingly, VNO1 310 provides a customized AAF (virtualized function: V_T_AA 335) to the TCSP to be instantiated in its network or in the cloud. V_T_AA 335 can be used whenever the user needs an admission of a session. As noted above, V-L-AA 367 could also be instantiated in InP1 360. FIG. 7 is a flowchart which illustrates the use of such a virtualized function according to an embodiment. Here the V-AA 311 establishes the virtualized AAF V-T-AA 335. The Virtualized AAF V-T-AA 335 can be accessed (but not modified) by the T-AA 331. The VNO maintains the ability to modify both the AA data and the virtualized AA function. This is useful to provide access through non-trusted APs.

Figure 11:
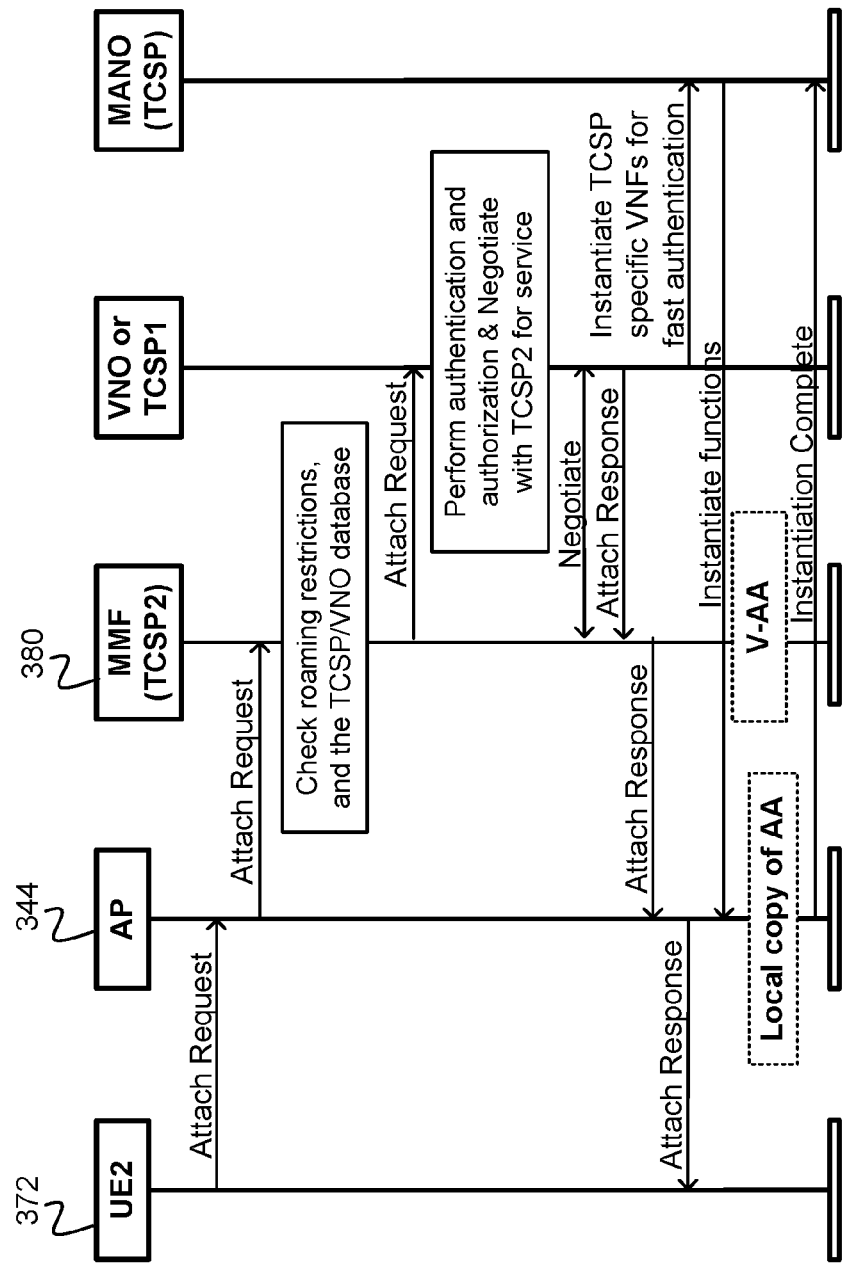
FIG. 11 is a message flow diagram illustrating message flows used in a fourth attach process.

FIG. 11 is a message flow diagram which is illustrates an example message flow for embodiments relating to Scenario 2 for either option A or option B discussed above. Here it is assumed the VNO has a service agreement with the TCSP1 and this information is available to other TCSPs so that the VNO can obtain service from other TCSPs. The information about the association between a TCSP and the VNO may also be included in the UE attach request. Further, in this example TSP2 has allocated resources to a roaming or 'Basic Service' slice to serve non-subscribed customers. In this case UE2 372 connects to an AP 344, which checks the VN ID and sends the request to an MMF of TCSP2 380 associated with the TCSP's 'basic service' slice. The TCSP2 380 will identify the request as being directed to a VNO for which TCSP2 380 has no service agreement. The MMF will check roaming restrictions and check the TCSP and the VNO database. As an example, a UE, which would otherwise be authenticated, may be declined access in certain geographic locations or with specific InPs. A VNO may have a list of InPs through which the VNO will not allow traffic to traverse, even if they are connected to a TCSP that the VNO has a relationship with. Further, a TCSP may have InPs that it won't deal with regardless of who the VNO or other TCSP is. For example, a VNO for a national security group may allow a TCSP to make on the fly deals with InPs or TCSPs, except for any InP that uses equipment from a vendor that is deemed to be insecure. This means that attach requests would be rejected based on the InP that the UE is connecting through (even if the InP has an agreement with the primary TCSP). The MMF then forwards the request to either TCSP1 330 or VNO 1 310 directly. VNO 310 may reject or negotiate with TCSP2 to provide the required service and if agreed TCSP2 provides the service in a manner similar to those of the previously discussed scenarios. The VNO may permit a TCSP (e.g., TCSP1) to arrange access through another TCSP and InP. The VNO would set out conditions that it is willing to accept (e.g. cannot cost more than X). If the TCSP can negotiate pursuant to those conditions to handle the UE connection.

According to an embodiment, if future users are anticipated, VNO 310 may negotiate to have VNO_AA functions partially instantiated at TCSP2 380 or APs within InP3 340 to provide faster response for subsequent requests. In which case, a MANO within the TCSP (or InP) may be involved to instantiate virtual AA functions within TCSP2 380 or APs within InP3 340.

FIG. 6 is an exemplary block diagram of a host processing system 601 that may be used for implementing the various network functions. As shown in FIG. 6, host 601 includes a processor 610, working memory 620, non-transitory storage 630, network interface, I/O interface 1240, and depending on the node type, a transceiver 660, all of which are communicatively coupled via bi-directional bus 670.

According to certain embodiments, all of the depicted elements may be utilized, or only a subset of the elements. Further, the processing system 601 may contain multiple instances of certain elements, such as multiple processors, memories, or transceivers. Also, elements of host 601 may be directly coupled to other components without the bi-directional bus. Host 601 may form part of a network element, such as an AP or router, it may form a dedicated processing system for implementing network functions. Accordingly a host 601 may execute machine executable instructions for implementing various network functions, including the AA and M&PC functions discussed herein.

The memory may include any type of non-transitory memory such as static random access memory (SRAM), dynamic random access memory (DRAM), synchronous DRAM (SDRAM), read-only memory (ROM), any combination of such, or the like. The mass storage element may include any type of non-transitory storage device, such as a solid state drive, hard disk drive, a magnetic disk drive, an optical disk drive, USB drive, or any computer program product configured to store data and machine executable program code. According to certain embodiments, the memory or mass storage have recorded thereon statements and instructions executable by the processor for instantiating the aforementioned functions and for performing the aforementioned steps.

Through the descriptions of the preceding embodiments, the present disclosure may be implemented by using hardware only or by using software and a necessary universal hardware platform. Based on such understandings, the technical solution of the present disclosure may be embodied in the form of a software product. The software product may be stored in a non-volatile or non-transitory storage medium, which can include the device memory as described above, or stored in removable memory such a compact disk read-only memory (CD-ROM), flash memory, or a removable hard disk. The software product includes a number of instructions that enable a computer device (computer, server, or network device) to execute the methods provided in the embodiments of the present disclosure. For example, such an execution may correspond to a simulation of the logical operations as described herein. The software product may additionally or alternatively include number of instructions that enable a computer device to execute operations for configuring or programming a digital logic apparatus in accordance with embodiments of the present disclosure.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

The invention claimed is:

1. A method of admitting a user session to a virtual network, the method comprising:
   receiving, at a mobility management function in a core network domain, an attach request from a User Equipment associated with the virtual network;
   transmitting an instruction, from the mobility management function towards the User Equipment, to begin an authentication challenge with an Authentication Function, the Authentication function both associated with and resident within the virtual network which is both associated with the User Equipment and distinct from the core network; and
   transmitting, by the mobility management function, an instruction to admit the user equipment to a user session in the virtual network in response to receipt of an indication of successful completion of the authentication challenge.

2. The method of claim 1 wherein the step of receiving the attach request includes receiving an attach request from a network access point administered and managed separately from the core network domain.

3. The method of claim 1 wherein the authentication challenge is performed in response to completion of an admission control check.

4. The method of claim 3 wherein the admission control check determines that there are sufficient resources in the virtual network to support the requested session.

5. The method of claim 3 wherein the admission control check determines that there are sufficient resources in the core network domain to support the requested session.

6. The method of claim 1 wherein the authentication challenge includes obtaining an authentication challenge credential from an Authentication and Authorization function in the virtual network.

7. The method of claim 6 wherein the authentication challenge further includes issuing an authentication challenge to the User Equipment in accordance with the obtained authentication challenge credential.

8. The method of claim 1 further comprising, prior to admitting the user equipment, obtaining authorization for access to the virtual network for the user equipment.

9. The method of claim 1 wherein the authentication function is resident within the virtual network and has been instantiated upon resources associated with the Radio Access Network.

10. The method of claim 1 further including performing a Non Access Stratum security setup with the User Equipment.

11. The method of claim 1 wherein the step of admitting the user equipment includes transmitting an attach acceptance response towards an access point in the Radio Access Network.

12. The method of claim 1 wherein there is a plurality of virtual networks and the Attach Request identifies the virtual network of the plurality of virtual networks.

13. The method of claim 1 wherein there is a plurality of virtual networks and the Attach Request identifies the operator of the virtual network.

14. The method of claim 1 wherein the virtual network is established within the core network domain by allocating at least one network slice to the virtual network.

15. The method of claim 14 wherein the network slice includes Radio Access Network (RAN) resources.

16. The method of claim 15 wherein the RAN resources are provided by a domain separate from the core network domain.

17. A mobility management function in a core network domain for admitting a user session in a virtual network, the mobility management function comprising:
   a network interface;
   a processor; and
   a machine readable memory storing machine executable instructions which when executed by the processor configure the mobility management function to:
      receive an attach request from a User Equipment associated with the virtual network over the network interface;
      transmit an instruction, from the mobility management function towards the User Equipment over the network interface, to begin an authentication challenge with an Authentication Function, the Authentication Function both associated with and resident within the virtual network which is both associated with the User Equipment and distinct from the core network; and
      transmit over the network interface, an instruction to admit the user equipment to a user session in the virtual network in response to receipt of an indication of successful completion of the authentication challenge.

18. The mobility management function of claim 17 wherein the mobility management function is configured to receive the attach request from a network access point administered and managed separately from the core network domain.

19. The mobility management function of claim 17 wherein the mobility management function is configured to perform an admission control check and the authentication challenge is performed in response to completion of the admission control check.

20. The mobility management function of claim 17 wherein the executable instructions cause the mobility management function to obtain authorization for access to the virtual network for the user equipment prior to admitting the user equipment.

21. The mobility management function of claim 17 wherein the executable instructions cause the mobility management function to transmit an attach acceptance response to an access point in the Radio Access Network.

22. The method of claim 9 wherein the authentication function has been instantiated upon resources associated with the Radio Access Network in response to a request from the operator of the virtual network.

* * * * *